United States Patent [19]

Harvey

[11] 3,992,334
[45] Nov. 16, 1976

[54] METHOD FOR ADHESION OF STEEL CORD TO RUBBER (USING N-(SUBSTITUTED OXYMETHYL) MELAMINES AND DIMETHYLOL UREA)

[75] Inventor: Sidney F. Harvey, Somerset, N.J.

[73] Assignee: American Cyanamid Company, Stamford, Conn.

[22] Filed: Aug. 9, 1974

[21] Appl. No.: 496,246

[52] U.S. Cl. .................................. 260/3; 260/3.3; 260/4 R; 260/5; 260/39 P; 260/39 SB; 260/852; 260/853; 260/854; 260/855; 260/856; 260/849; 428/302; 428/494; 428/503
[51] Int. Cl.² .................. C08L 27/00; C08L 61/20; C08L 61/26
[58] Field of Search ............... 260/3, 3.5, 4, 5, 849, 260/852, 856, 853, 39 R, 39 P, 39 SB, 850, 854, 855, 3.3

[56] References Cited
UNITED STATES PATENTS

| | | | |
|---|---|---|---|
| 3,194,294 | 7/1965 | van Gils | 260/845 |
| 3,523,033 | 4/1970 | Verbury et al. | 260/849 |
| 3,638,702 | 1/1972 | Eudter | 260/852 |
| 3,715,172 | 2/1973 | Dembowski et al. | 260/852 |

Primary Examiner—J. Ziegler
Attorney, Agent, or Firm—Charles J. Fickey

[57] ABSTRACT

A vulcanizable rubber composition is provided which comprises rubber, a filler material, an N-(substituted oxymethyl)melamine and 1,3-dimethylolurea.

9 Claims, No Drawings

METHOD FOR ADHESION OF STEEL CORD TO RUBBER USING N-(SUBSTITUTED OXYMETHYL) MELAMINES AND DIMETHYLOL UREA

Generally stated the subject matter of the present invention relates to a vulcanizable rubber composition which forms a strong bond with a tire cord material.

BACKGROUND OF THE INVENTION

Many rubber articles, principally automobile tires, but also including hoses, conveyor belts, transmission belts, and the like are usually reinforced with fibers in cord form. In all such instances the fiber must be firmly bonded to the rubber. This is so whether the fiber is natural, synthetic or metallic, or whether the rubber is natural or synthetic.

The conventional practice has been to prepare the fiber by pretreatment with a rubber latex and a phenol-formaldehyde condensation product, wherein the phenol is almost always resorcinol. By a mechanism not completely understood, the resin reacts with the fiber and the rubber, effecting a firm reinforcing bond.

An alternative method entails compounding a vulcanizable rubber stock composition with the components of the phenol-formaldehyde condensation product. The components of the condensation product consist of a formaldehyde, or methylene acceptor and a formaldehyde, or methylene donor. The most commonly employed methylene acceptor is resorcinol, while the more commonly employed methylene donors are the N-(substituted oxymethyl) melamines. The effect achieved is resin formation in situ during vulcanization of the rubber, creating a bond between the fiber and rubber irrespective of whether the fiber has been pretreated. This method is particularly useful with steel cord, where pretreatment has been largely ineffective.

However, the use of resorcinol has many inherent disadvantages. One of the most frequently encountered is occasioned by the fact that resorcinol is not readily dispersed in rubber. In addition, resorcinol is toxic. The most commonly encountered side effect of its use is the dermatological reaction commonly referred to in the trade as "red hand". These difficulties are further compounded by the fact that there is a worldwide shortage of resorcinol.

In addition, there is an increased need in the industry for fiber reinforcing of rubber to survive high dynamic stress, such as flexing, has brought about a continuing search for other and better methods for achieving high adhesive strength.

The present invention represents the culmination of a long series of investigations, conducted largely by the inventor, directed to finding a vulcanizable rubber stock composition comprising the components of the phenol-formaldehyde condensation product which avoids the use of resorcinol as the methylene acceptor.

Accordingly, it is a primary object of the present invention to provide a vulcanizable rubber stock composition comprising the components of the phenol-formaldehyde condensation product without resorting to the use of resorcinol as a methylene acceptor.

Another object of the invention is to provide a vulcanizable rubber stock composition which provides equal or better results for the bonding of fibers to rubber.

Generally then, it is an object of the invention to provide a new and improved vulcanizable rubber stock which avoids the inherent disadvantages of employing resorcinol as the methylene acceptor, as well as providing equal or better bonding results.

Additional objects and advantages of the invention will be set forth in part in the broad description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose, as embodies and broadly described, the present invention relates to an improved vulcanizable rubber composition comprising rubber, a filler material, an N-(substituted oxymethyl)melamine and 1,3-dimethylolurea.

It is to be understood that both the foregoing general description and the following detailed description are exemplary and explanatory and are not restrictive of the invention.

The advent of the present invention is particularly unexpected when one considers that 1,3-dimethylolurea acts as a methylene acceptor when it has heretofore been employed by those skilled in the art as a methylene donor. See U.S. Pat. No. 3,509,018, Leshin et al.

To reiterate, the invention is completely unexpected since the prior art is completely devoid of any teaching that a methylolated urea compound, especially 1,3-dimethylolurea, can function as a methylene acceptor in a resin forming reaction. Further evidence of the novelty and unobviousness of the present invention is that the methylene acceptors generally employed in the art are meta amino or hydroxyl substituted benzenes, particularly resorcinol.

The N-(substituted oxymethyl)melamine which serves as the methylene donors when combined with the novel 1,3-dimethylolurea methylene acceptor of the present invention have the following general formula:

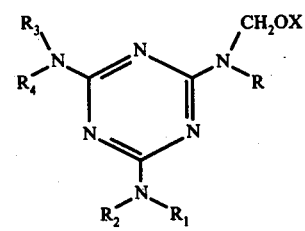

wherein X is hydrogen or lower alkyl (1–8 carbons); R, $R_1$, $R_2$, $R_3$ and $R_4$ are individually hydrogen, lower alkyl having from 1 to 8 carbon atoms or the group —CH$_2$OX, wherein X is as defined above. Specific illustrative species include hexakis (methoxymethyl)melamine, N,N',N''-trimethyl N,N',N''-trimethylolmelamine, hexamethylolmelamine, N,N',N''-trimethylolmelamine, N-methylolmelamine, N,N'-dimethylolmelamine, N,N',N''-tris (methoxymethyl)melamine, and N,N',N''-tributyl-N,N',N''-trimethylolmelamine. A preferred methylene donor is hexakis (methoxymethyl)melamine.

The N-methylol derivatives of melamine are prepared by known methods by reacting melamine with 1 to 6 molar equivalents of formaldehyde. Although N-(substituted oxymethyl)melamines are the preferred methylene donors, others such as hexamethylenetetramine, N-(substituted oxymethyl)ureas, N-(substituted oxymethyl)imidazolidines, N-(substituted oxymethyl) hydantoins may also be useful.

Any textile material normally used to reinforce rubber may be used with the vulcanizable compositions of this invention, including cotton, rayon, polyamides, and polyester fibers. A particularly useful reinforcing material found to form strong adhesive bonds to rubber in accordance with the invention is steel or brass-plated steel wire.

The rubber being bonded to the reinforcing material may be any rubber used in the manufacture of automobile tires, drive belts, conveyor belts or pressure hose. These include natural rubber; synthetic diene rubbers, such as polybutadiene or polyisoprene; ethylene-propylene terpolymer rubbers (EPDM); butadiene, styrene copolymer rubbers (SBR); butadiene acrylonitrile copolymer rubbers (NBR); chloroprene rubber, or chlorosulfonated polyethylene, or mixtures thereof;

The rubber vulcanizate which is bonded to the textile fiber or steel wire by in situ resin formation will contain conventional compounding ingredients such as carbon black, antioxidants, sulfur, zinc oxide, accelerators, high surface area activated silica (including mixtures thereof with carbon black), processing and softening oils, and the like.

The N-(substituted oxymethyl)melamines are incorporated into the rubber vulcanizate in an amount of from about 1 to 10 parts per hundred parts of rubber, preferably about 2 to 4 parts per hundred of rubber. The 1,3-dimethylolurea is incorporated into the rubber vulcanizate in an amount of from about 0.5 to 8 parts per hundred parts of rubber, preferably 1 to 3 parts per hundred of rubber.

A preferred method of making the rubber vulcanizate is to mix the rubber, carbon black, zinc oxide, lubricants, and the like, in a Banbury mixer at a temperature of about 300° F. The resulting masterbatch is then compounded on a standard two-roll rubber mill with sulfur, accelerators, silica, formaldehyde precursor and dimethylolurea. The vulcanizable composition is then shaped, e.g., by extrusion or calendering, put in contact with the filamentary reinforcing material and vulcanized. In the examples which follow, 15 steel cords are embedded in the vulcanized rubber.

Adhesion is measured using ASTM D-2229 modified by pulling 7 alternating wires while holding the sample by two adjacent wires protruding from the opposite side of the sample, thereby reducing the effect of the rubber modulus on the adhesion values.

For optimum adhesion of the steel cords to rubber it has been found to be desirable to incorporate a high surface area activated silica into the vulcanizable composition. When used, silica is added in an amount of from about 2 to 14 parts per hundred parts of rubber, preferably 8 to 12 parts per hundred parts of rubber.

The following examples are provided for illustrative purposes and may include particular features of the invention. However, the examples should not be construed as limiting the invention, many variations of which are possible without departing from the spirit or scope thereof.

EXAMPLE

Two masterbatches containing 100 parts of rubber and having the following composition were mixed in a Banbury mixer at 300° F:

|  | Parts by Weight | |
| --- | --- | --- |
|  | A | B |
| Natural rubber | 52 | 52 |
| Polybutadiene | 18 | 18 |
| SBR rubber | 30 | 30 |
| Carbon black | 40 | 40 |
| Zinc oxide | 5 | 5 |
| Stearic Acid | 2 | 2 |
| Cyanaflex$^R$ 50 | 2 | 2 |
| Resorcinol | 1 | — |

The above masterbatches were then compounded on a standard rubber mill at 50° F for 5 minutes as follows:

| PREVULCANIZATE COMPOSITIONS | | |
| --- | --- | --- |
|  | A | B |
| Masterbatch | 150 | 149 |
| Sulfur | 2.4 | 2.4 |
| N-oxydiethylene benzothiazole-2-sulfenamide | 1.3 | 1.3 |
| Activated silica (Hi-Sil EP) | 10.0 | 10.0 |
| Hexakis(methoxymethyl)melamine | 3.0 | 3.0 |
| 1,3-Dimethylolurea | — | 1.0 |

The two compositions were embedded with 15 clean, brass plated steel wires, placed parallel, and the compositions vulcanized for 26 minutes at 307° F.

Adhesion, as measured in accordance with the aforementioned ASTM method (modified) gave the following results (adhesion in pounds per linear inch):

TABLE 1

| ADHESION EVALUATION | | |
| --- | --- | --- |
| (7 Specimens tested composition) | | |
|  | A | B |
| Adhesion Values | 110 | 110 |
|  | 112 | 139 |
|  | 86 | 157 |
|  | 135 | 144 |
|  | 119 | 139 |
|  | 140 | 127 |
|  | 157 | 126 |
| Average of 7 | 123 | 135 |
| Adhesion, pli | 246 | 270 |

The above data illustrate that 1,3-dimethylolurea provided adhesion values about 10 percent higher than resorcinol.

What is claimed is:

1. In a vulcanizable rubber composition consisting essentially of rubber, carbon black, a tire cord material and an N-(substituted oxymethyl)melamine having the following general formula

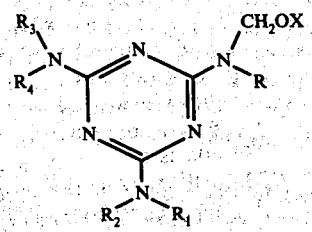

wherein X is hydrogen or lower alkyl having 1 to 8 carbon atoms; $R_1$, $R_2$, $R_3$, and $R_4$ are individually hydrogen, lower alkyl having 1 to 8 carbon atoms or the group $-CH_2OX$, wherein X is as defined above, the improvement which comprises an effective amount of 1,3-dimethylol urea which serves as the methylene acceptor.

2. The composition according to claim 1 wherein the N-(substituted oxymethyl) melamine is hexakis(methoxymethyl)melamine.

3. The composition according to claim 1 wherein the N-(substituted oxymethyl)melamine is present in a concentration of from about 1 to 10 parts per hundred parts of the rubber.

4. The composition according to claim 3 wherein the concentration of N-(substituted oxymethyl)melamine is from about 2 to 4 parts per hundred parts of the rubber.

5. The composition according to claim 1 wherein the concentration of 1,3-dimethylolurea is from about 0.5 to 8 parts per hundred parts of the rubber.

6. The composition according to claim 5 wherein the concentration of 1,3-dimethylolurea is from about 1 to 3 parts per hundred parts of the rubber.

7. The composition according to claim 1 wherein the rubber is selected from the group consisting of natural rubber, polybutadiene, polyisoprene, polychloroprene, butadiene/styrene copolymer rubbers, butadiene/acrylonitrile copolymer rubbers, ethylene-propylene terpolymer rubbers and blends thereof.

8. A vulcanized rubber article reinforced with a textile fiber or wire cord prepared from the vulcanizable rubber composition of claim 1.

9. The composition according to claim 1 comprising 2 to 14 parts of high surface area activated silica per hundred parts of the rubber.

* * * * *